Figure 22:
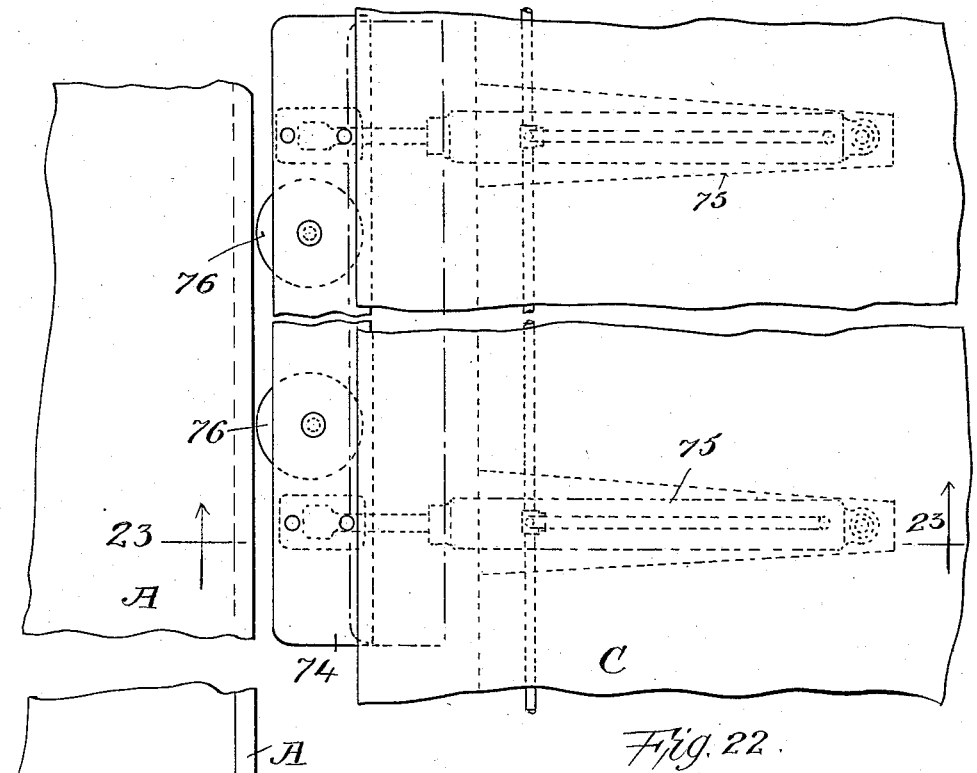

F. HEDLEY & J. S. DOYLE.
SAFETY PLATFORM MECHANISM.
APPLICATION FILED SEPT. 8, 1914.
1,149,759.
Patented Aug. 10, 1915.
15 SHEETS—SHEET 1.
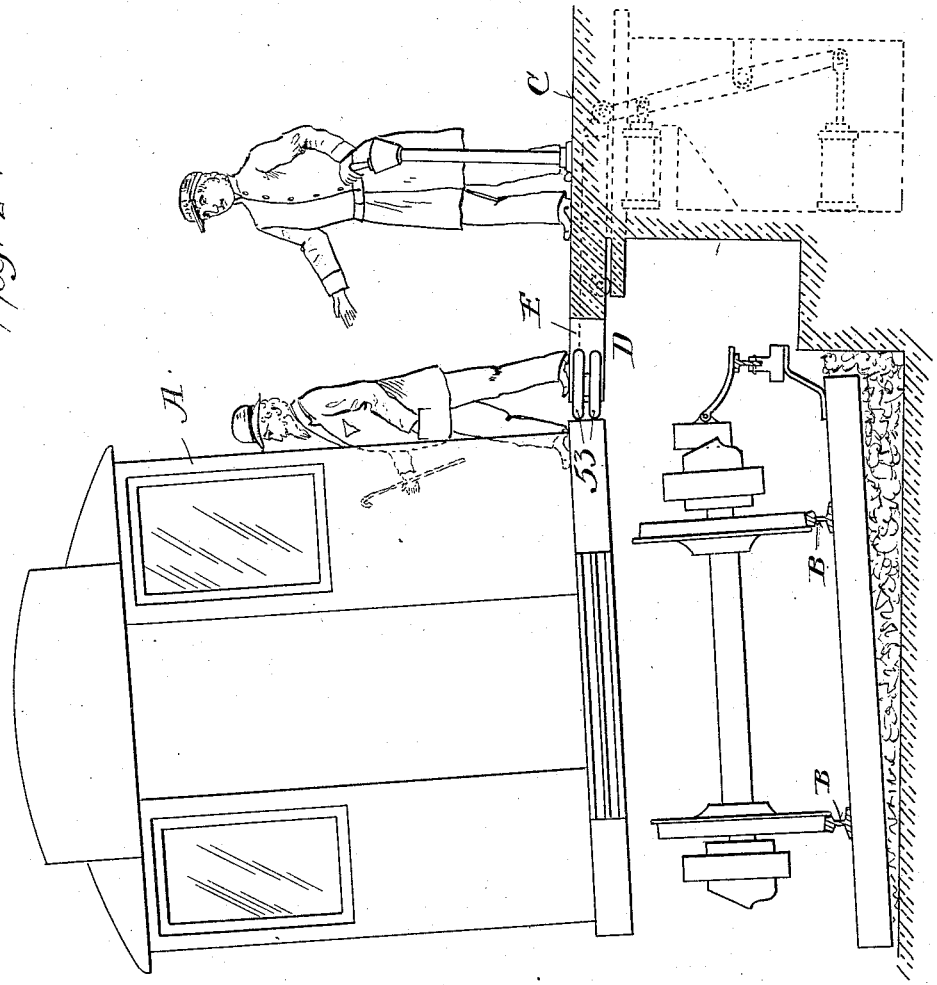
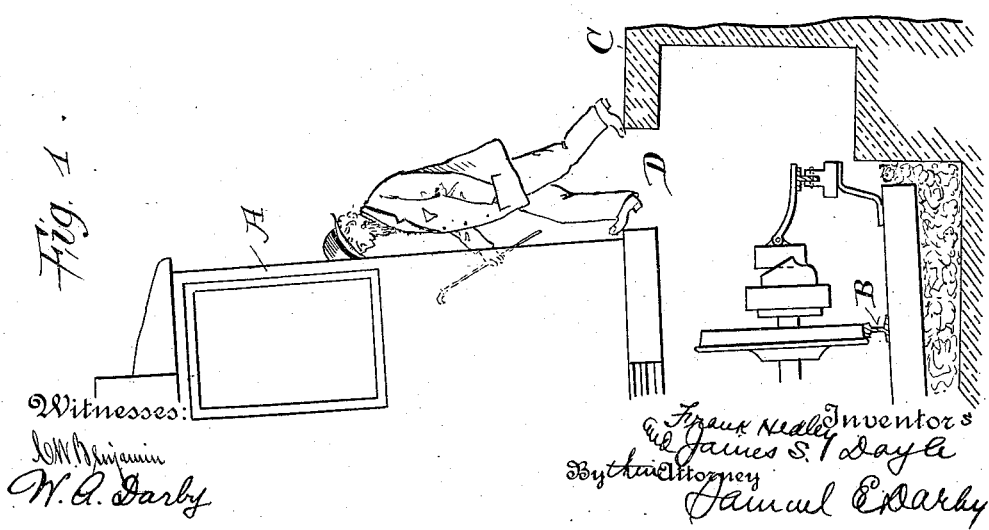

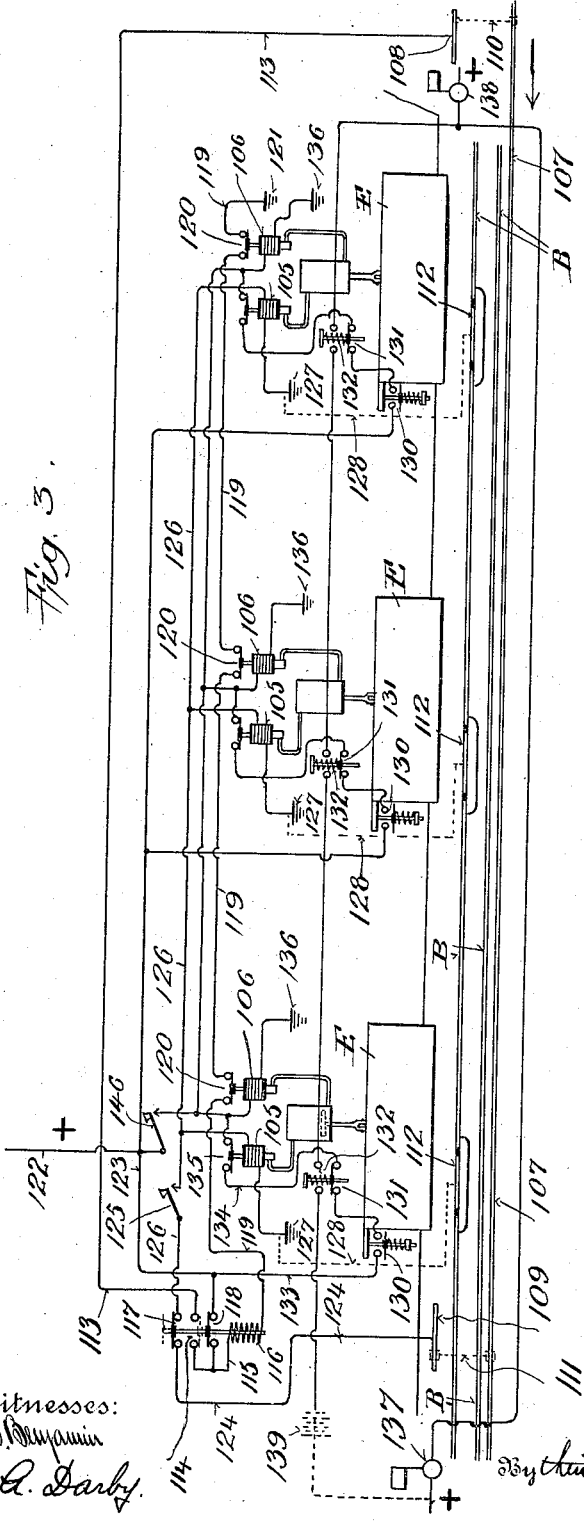

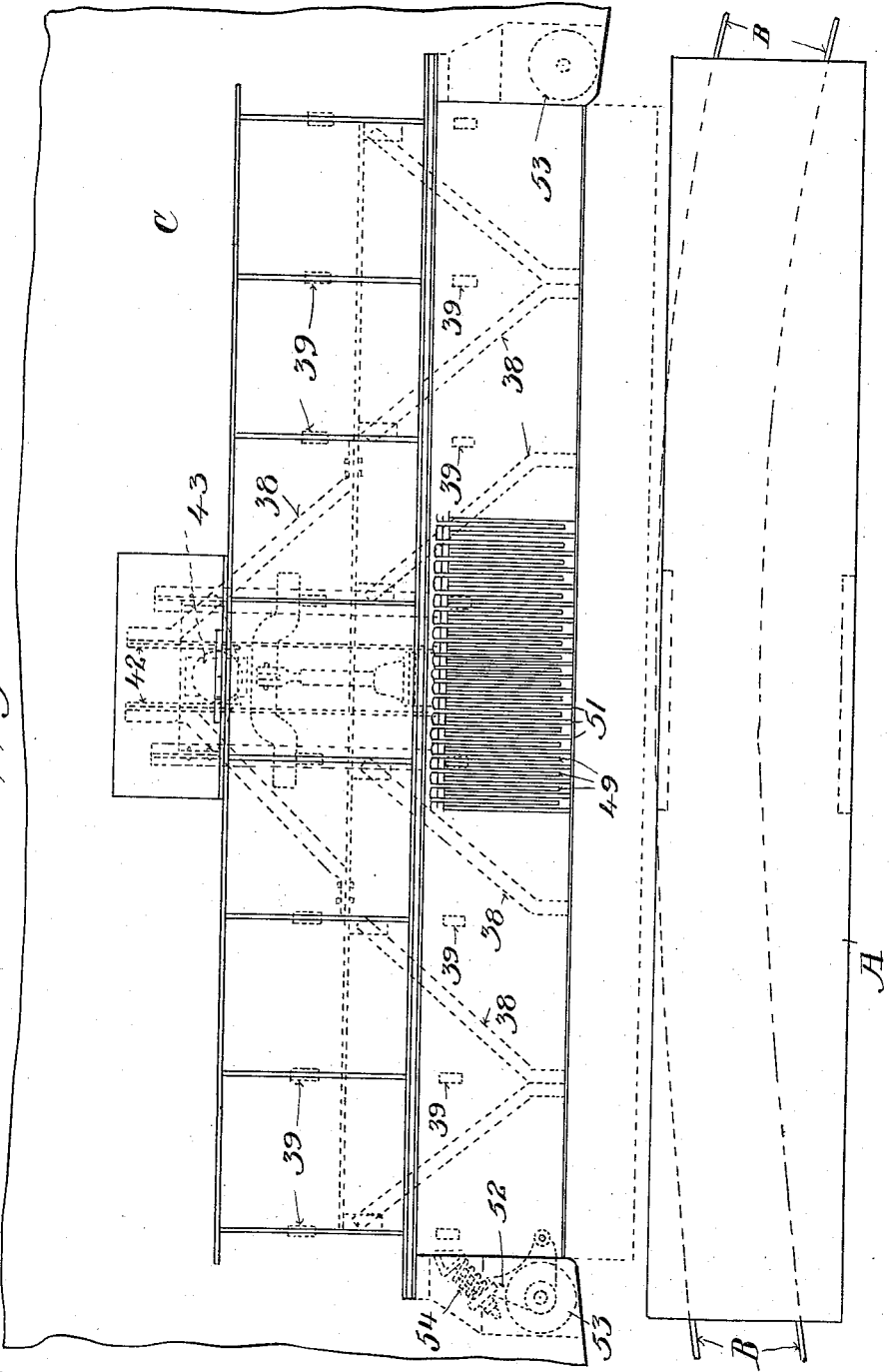

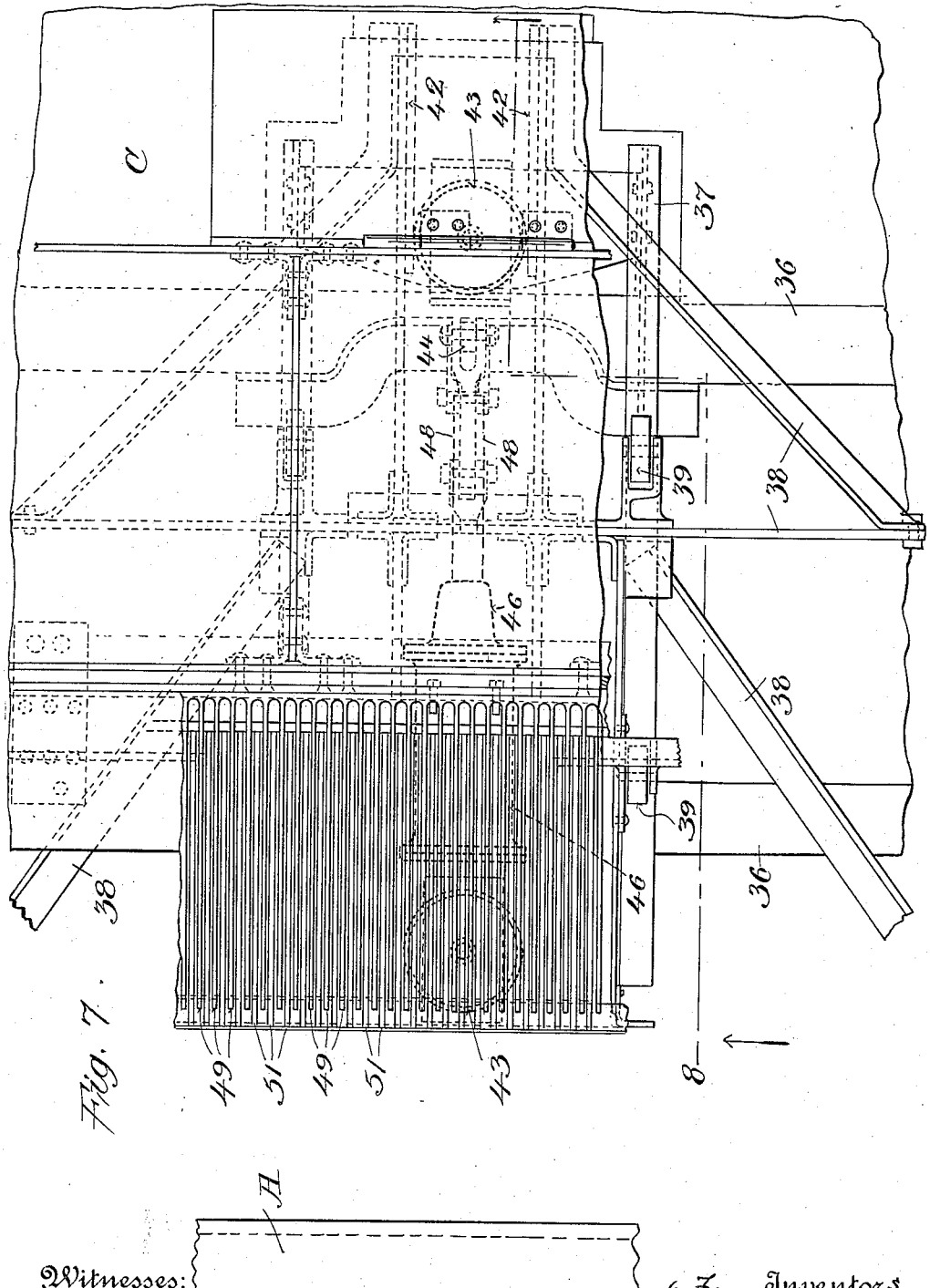

F. HEDLEY & J. S. DOYLE.
SAFETY PLATFORM MECHANISM.
APPLICATION FILED SEPT. 8, 1914.
1,149,759.
Patented Aug. 10, 1915.
15 SHEETS—SHEET 5.
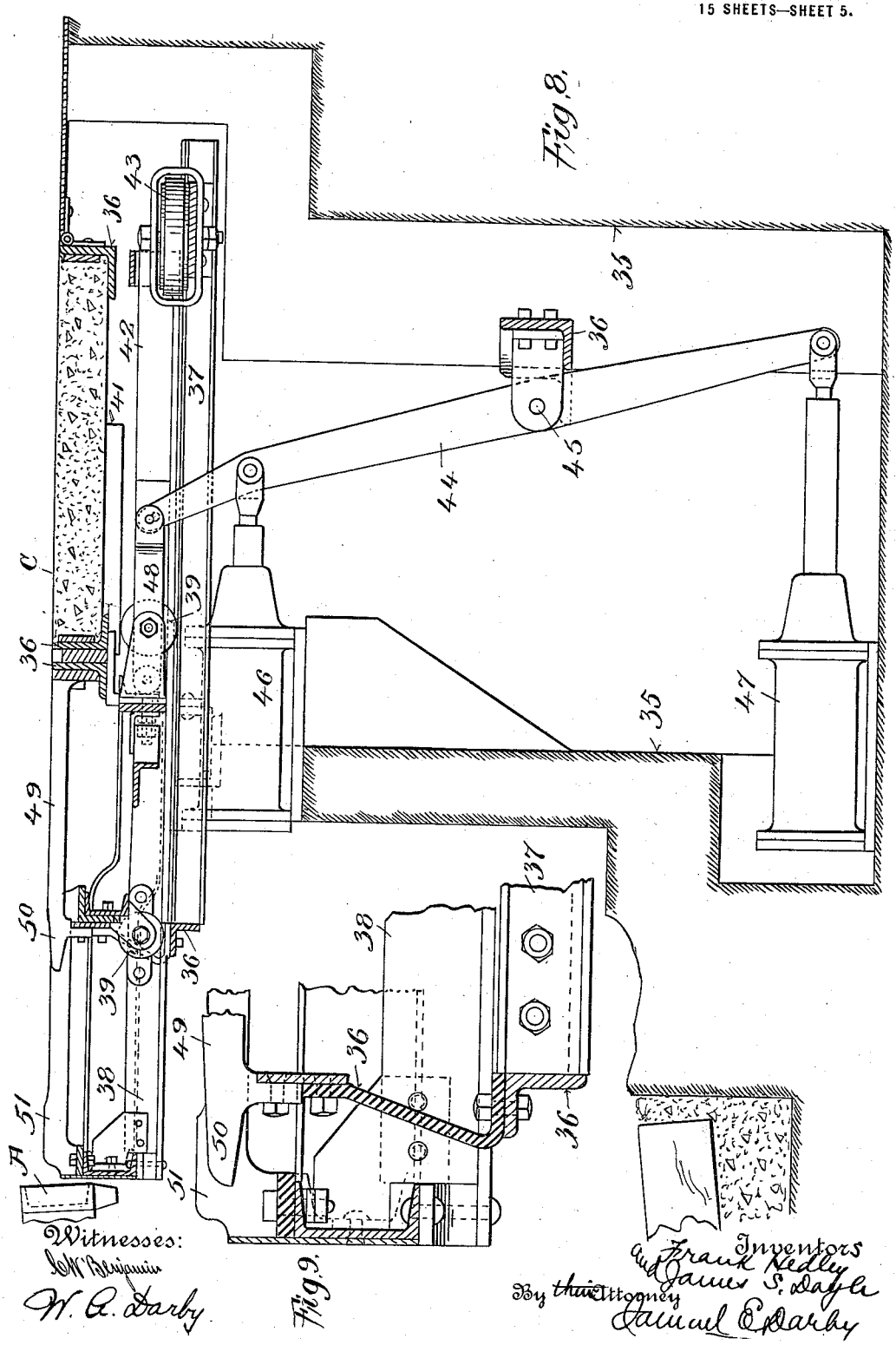

F. HEDLEY & J. S. DOYLE.
SAFETY PLATFORM MECHANISM.
APPLICATION FILED SEPT. 8, 1914.
1,149,759.
Patented Aug. 10, 1915.
15 SHEETS—SHEET 6.
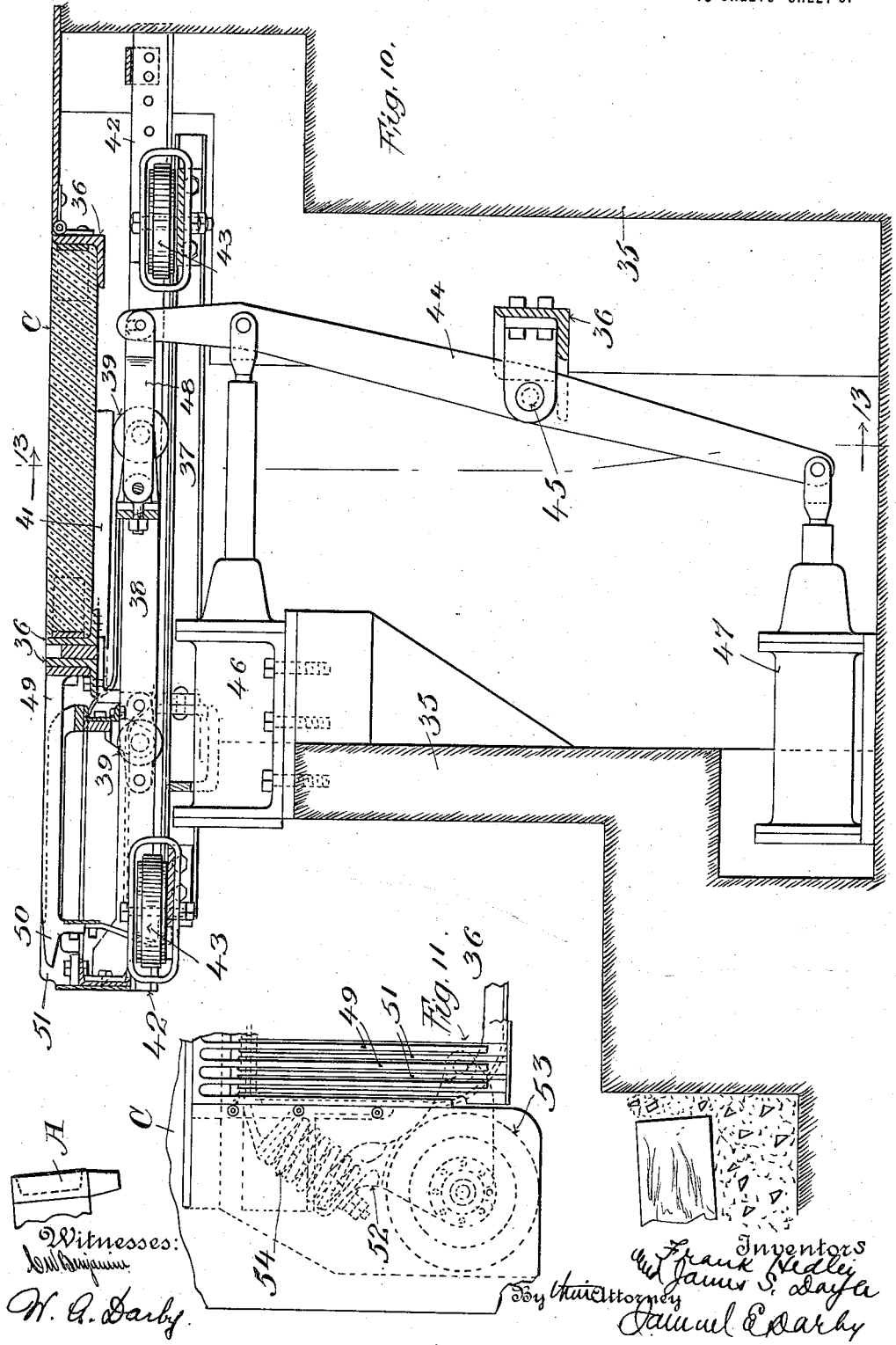

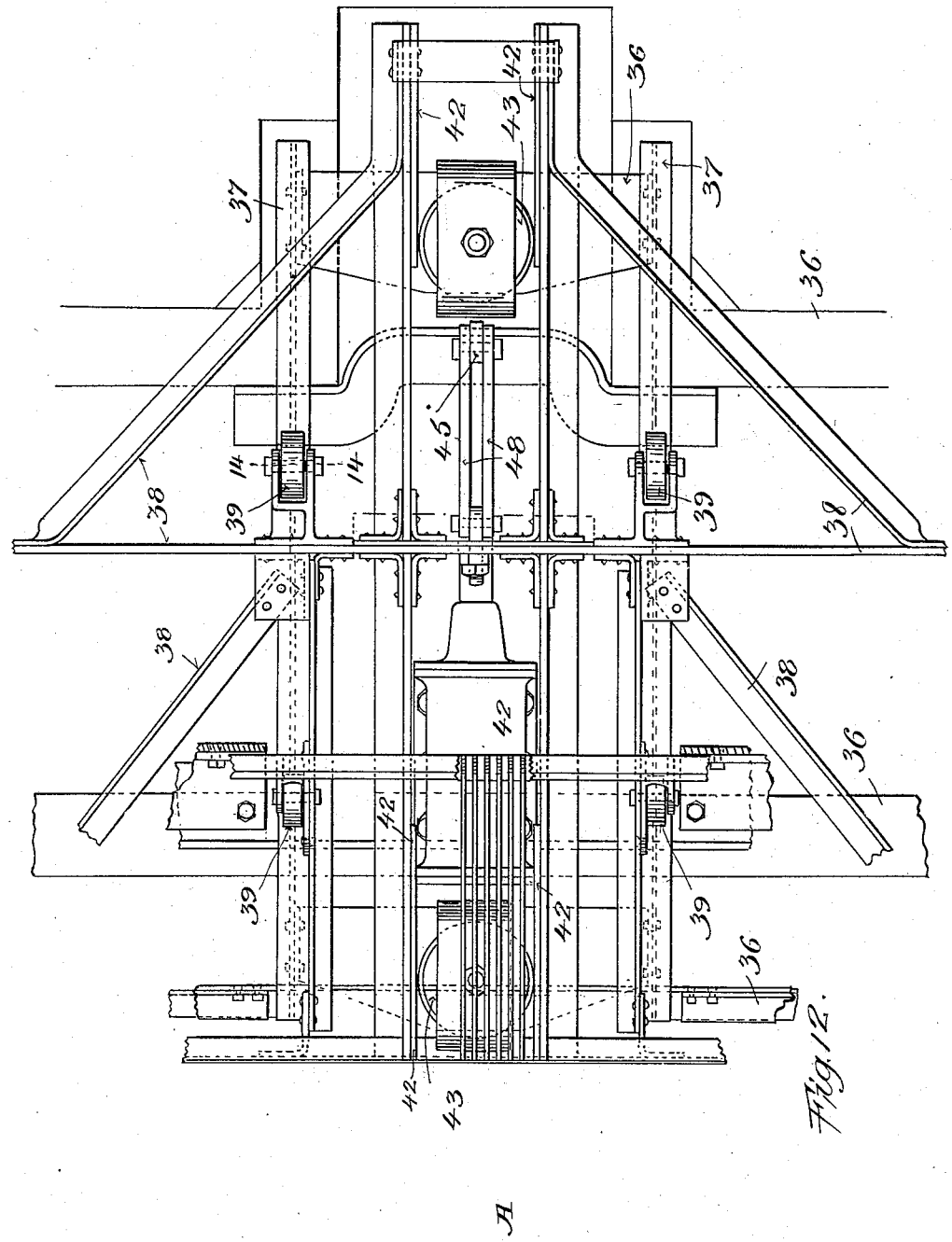

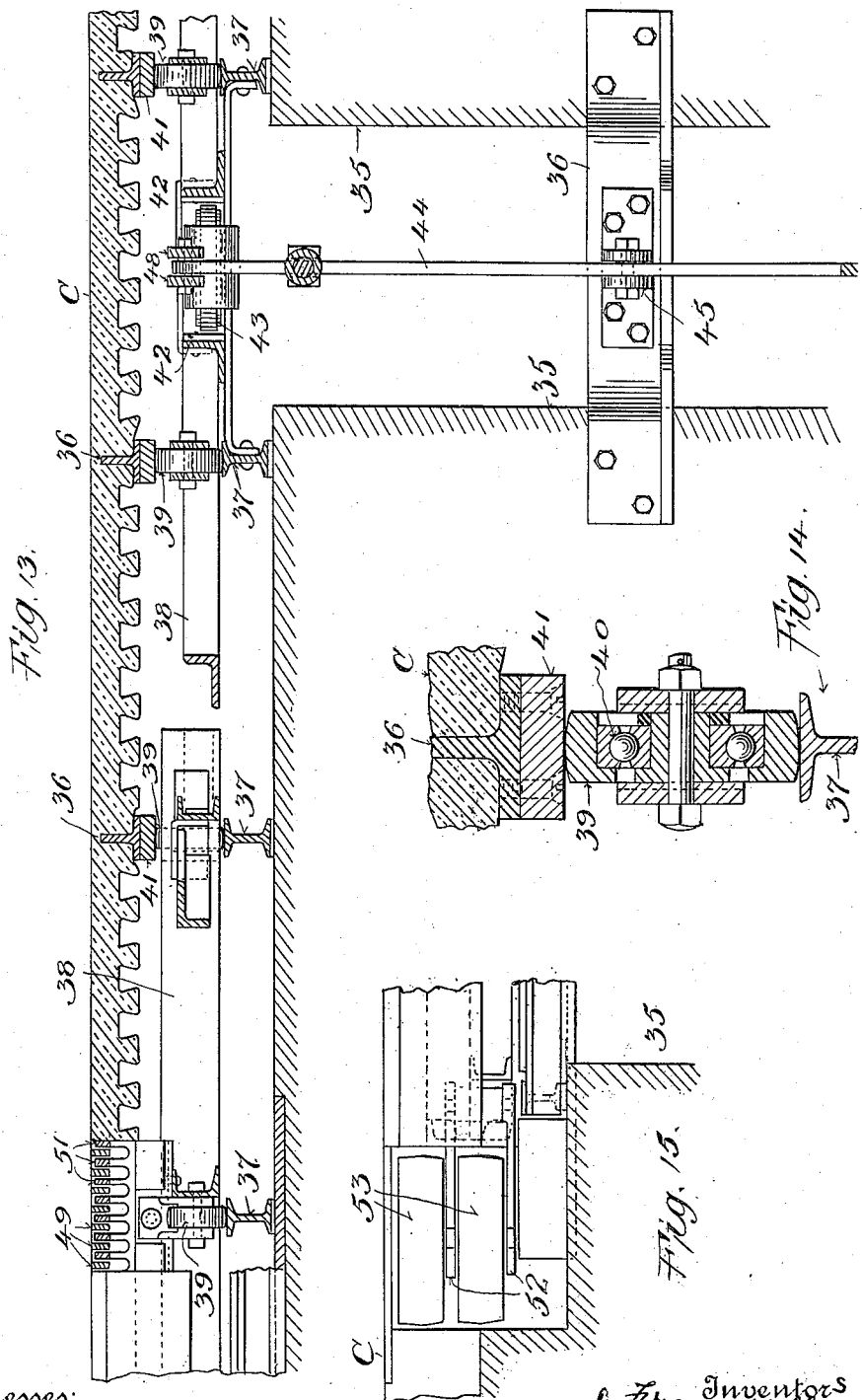

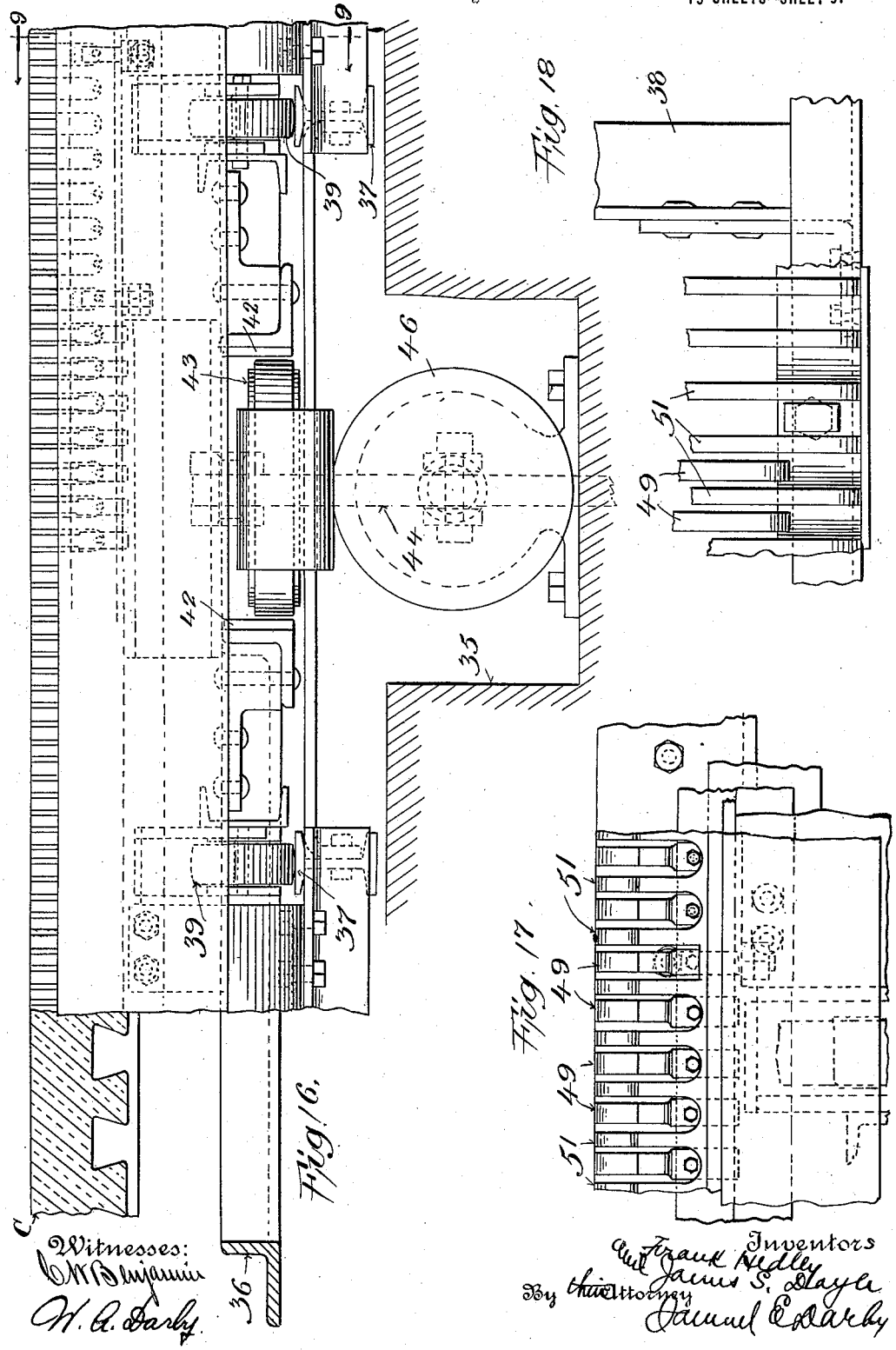

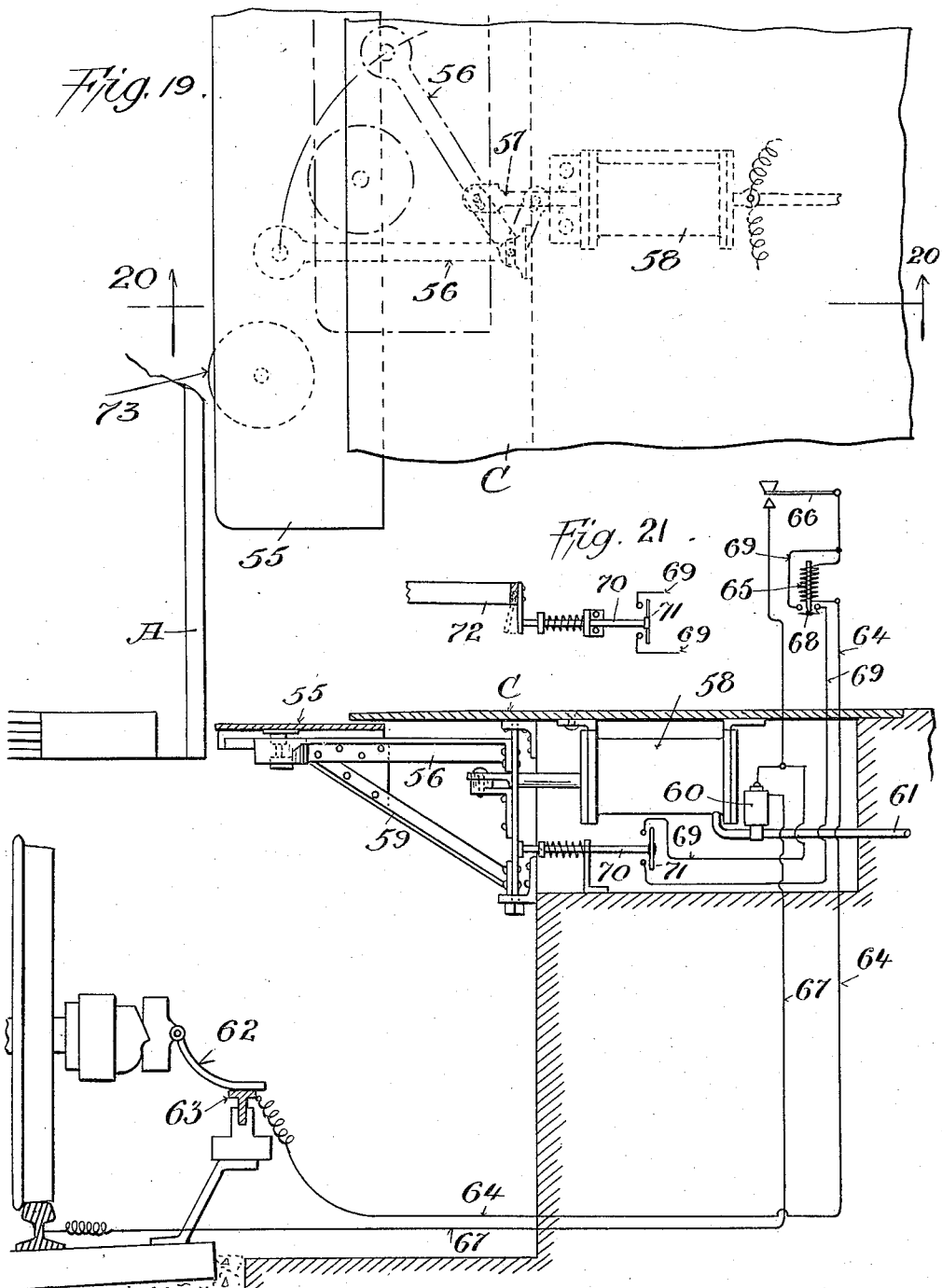

F. HEDLEY & J. S. DOYLE.
SAFETY PLATFORM MECHANISM.
APPLICATION FILED SEPT. 8, 1914.

1,149,759. Patented Aug. 10, 1915.
15 SHEETS—SHEET 11.

F. HEDLEY & J. S. DOYLE.
SAFETY PLATFORM MECHANISM.
APPLICATION FILED SEPT. 8, 1914.
1,149,759.
Patented Aug. 10, 1915.
15 SHEETS—SHEET 12.
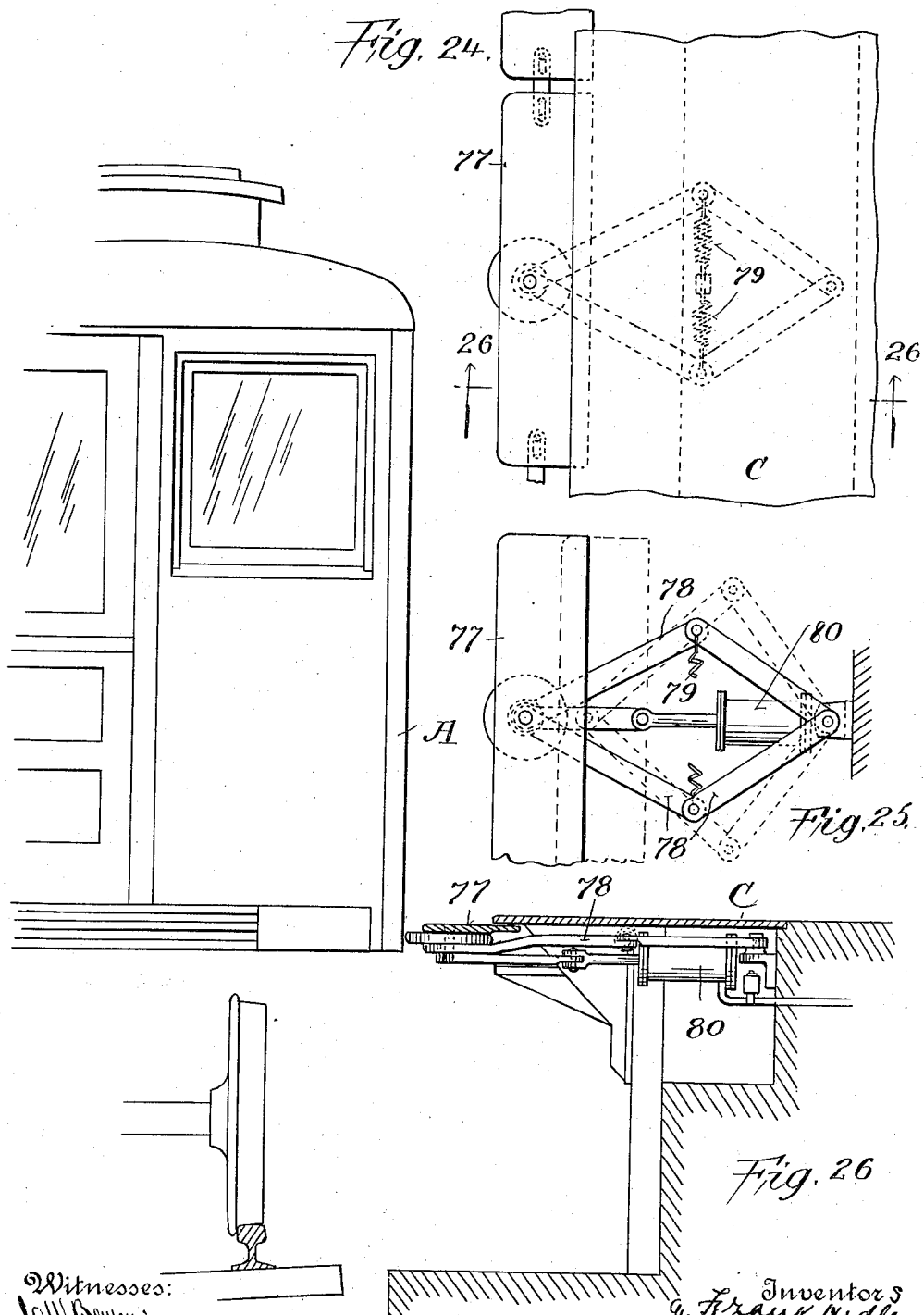

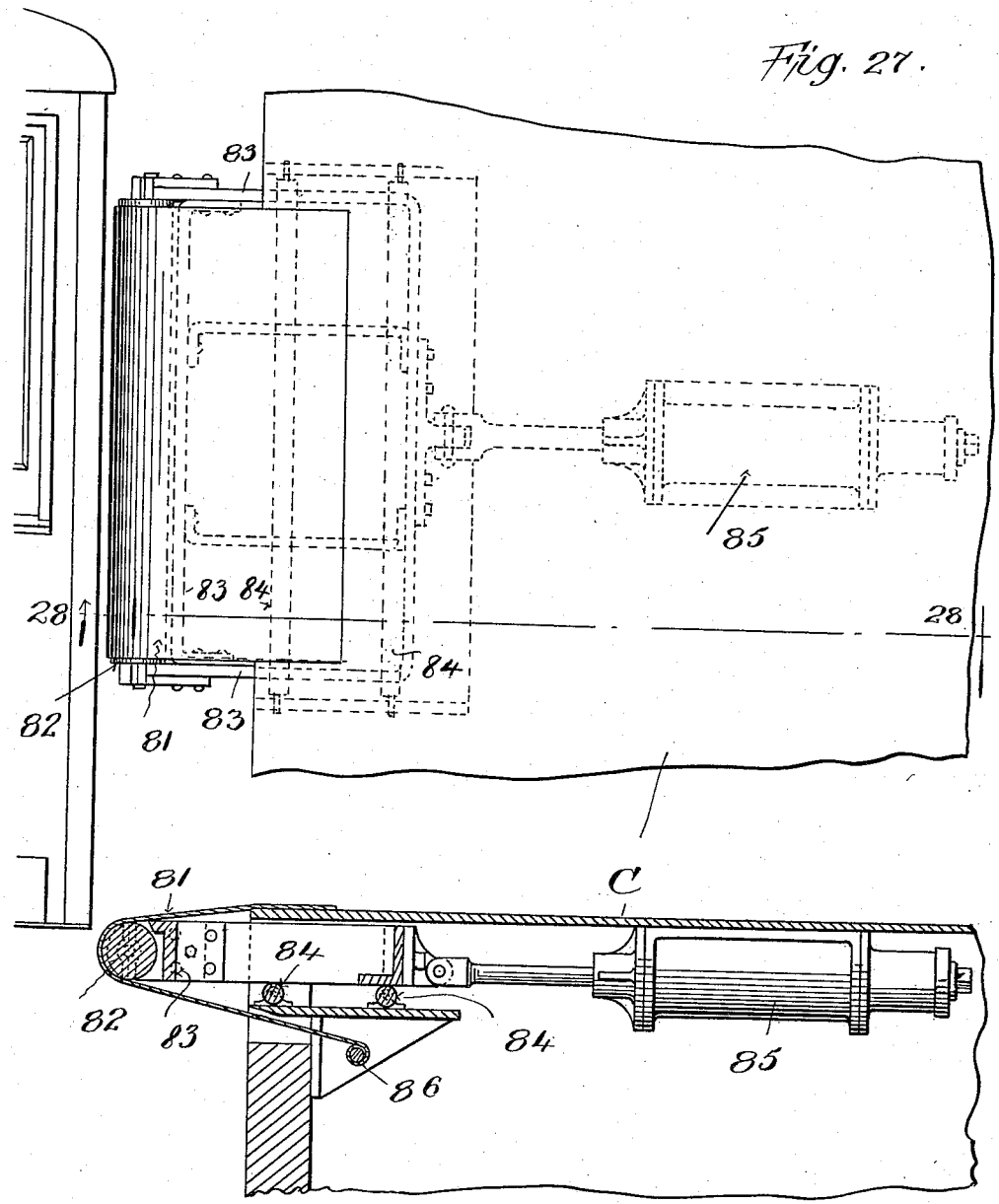

F. HEDLEY & J. S. DOYLE.
SAFETY PLATFORM MECHANISM.
APPLICATION FILED SEPT. 8, 1914.
1,149,759.
Patented Aug. 10, 1915.
15 SHEETS—SHEET 14.
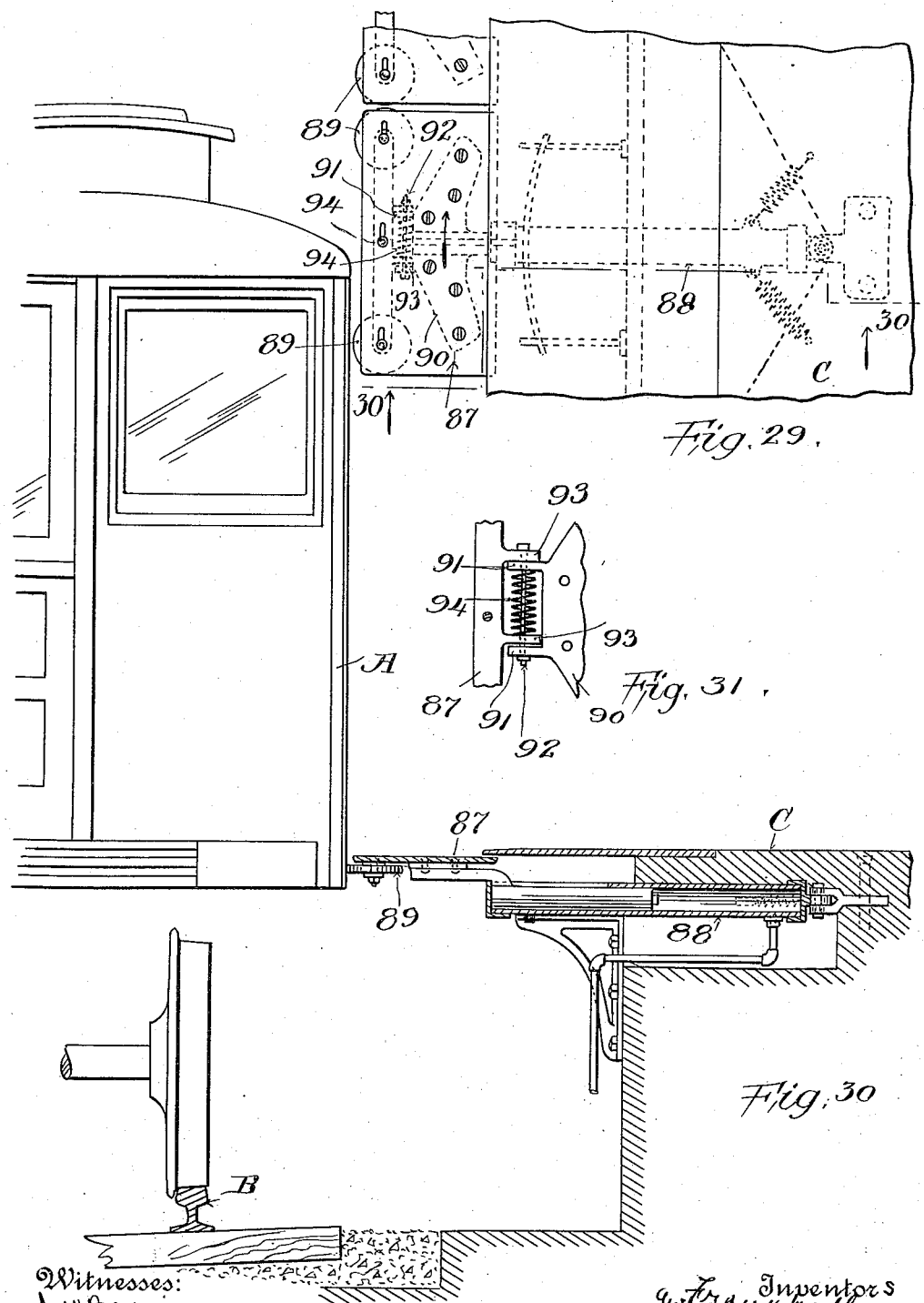

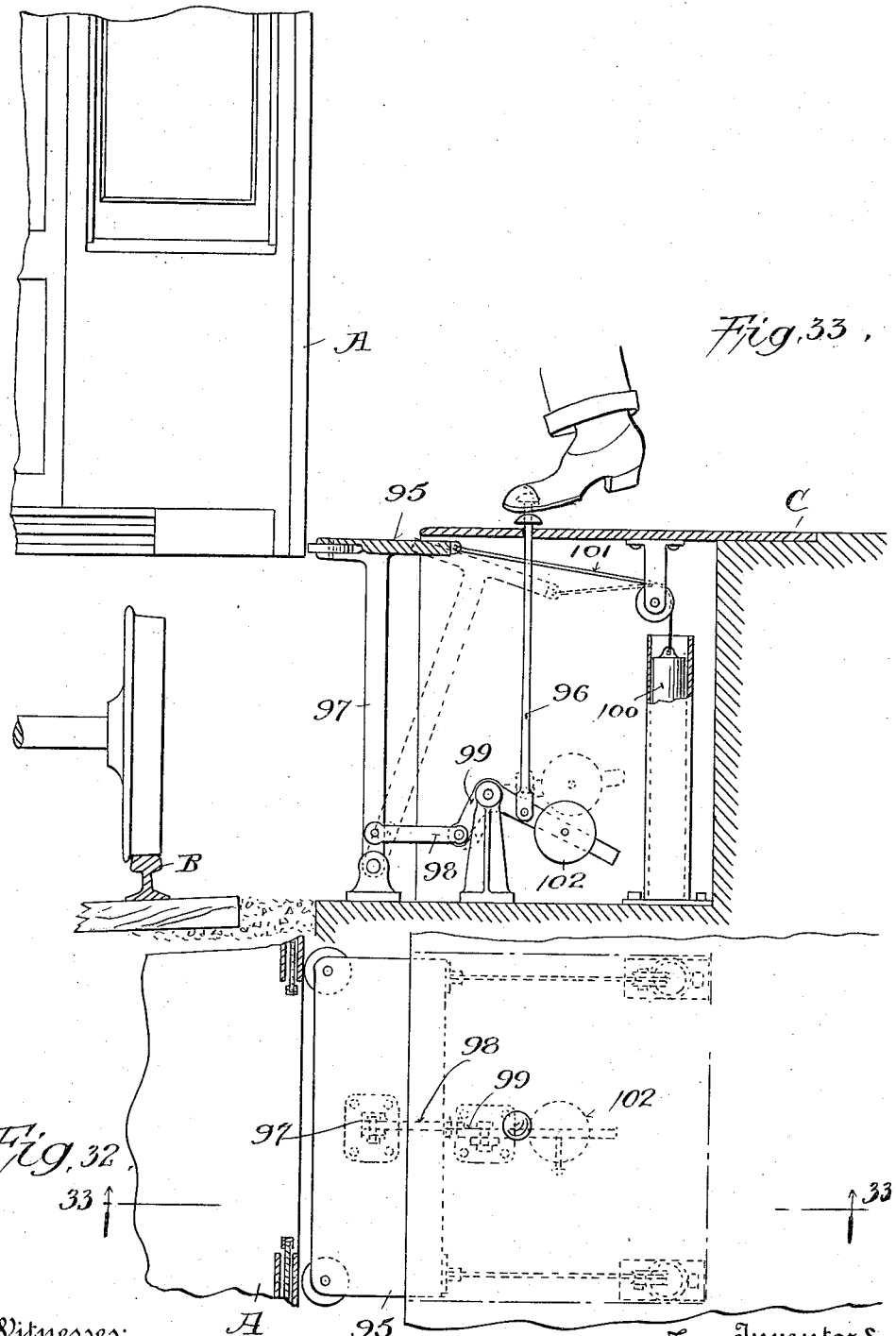

UNITED STATES PATENT OFFICE.

FRANK HEDLEY, OF YONKERS, AND JAMES S. DOYLE, OF MOUNT VERNON, NEW YORK.

SAFETY PLATFORM MECHANISM.

1,149,759.  Specification of Letters Patent.  Patented Aug. 10, 1915.

Application filed September 8, 1914. Serial No. 860,666.

*To all whom it may concern:*

Be it known that we, FRANK HEDLEY and JAMES S. DOYLE, both citizens of the United States, and residents, respectively, of Yonkers and Mount Vernon, in the county of Westchester, State of New York, have made a certain new and useful Invention in Safety Platform Mechanism, of which the following is a specification.

This invention relates to safety platform mechanism and particularly to gap filling devices between the sides of trains or cars and the proximate edge of a station or landing platform, and mechanism for controlling the same.

The object of the invention is to provide means which are simple and efficient for filling the gap between the sides of trains or cars and the adjacent edge of a station or landing platform, as a safety means to prevent accident or injury to passengers while boarding or alighting from the car or train by stepping, falling or being crowded into an unprotected gap or opening between the car or train and the platform.

A further object is to provide means of the nature referred to which are operable only when the car or train is in proper position or relation with reference to the platform or gap filling devices.

A further object is to provide gap filling devices of the nature referred to which are operable only when the train or car is in a predetermined position.

A further object is to provide devices of the nature referred to which are interlocked with train or car starting or stopping signaling system to prevent the train or car from being inopportunely started.

A further object is to provide the station platform or landing with movable sections or segments which are advanced against the side of the car or train when the latter is in predetermined position to fill the space or gap between the car or train and the stationary part of the station platform or landing.

A further object is to provide power mechanism for operating the movable platform segments or sections.

A further object is to provide means which are dependent on the conjoint action of the car or train and of an attendant on the station platform or landing to control the power mechanism for advancing the movable sections or portions of the station platform or landing.

A further object is to provide a construction of movable sections or segments of a stationary platform or landing which may be operated without endangering persons standing on or over the movable sections or segments.

A further object is to provide means controlled by the departure of a train or car from a station landing or platform for retracting or withdrawing the advanced sections or segments of the platform.

Other and important objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Figure 23:
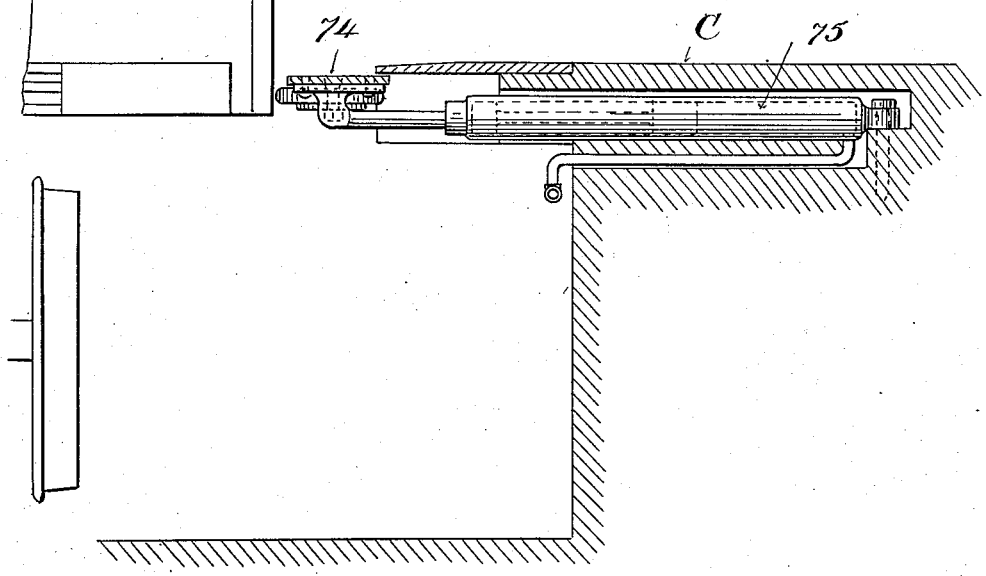

Referring to the accompanying drawings—Figure 1 is a broken view in transverse section illustrating a gap between the side of a car or train and the proximate edge of a station platform or landing, and the danger of injury or accident to passengers while boarding or alighting from the car or train over or across said gap. Fig. 2 is a similar view showing in a general way the operation of a gap filling mechanism embodying the principles of our invention. Fig. 3 is a diagram showing the electric circuit connections concerned in the operation of movable sections or segments of a stationary platform or landing in accordance with the principles of our invention. Figs. 4 and 5, are detail views of contact devices employed in connection with the control of the withdrawal movement of the movable platform sections or segments. Fig. 6 is a top plan view showing the relation of a curved track, a car thereon, a stationary platform or landing and a movable portion thereof, and indicating means for operating the movable portion of the platform, in accordance with the principles of our invention. Fig. 7 is a broken view in top plan, parts broken out, showing the structure of a movable section or segment of the platform, and a form of means for operating the same. Fig. 8 is a broken view in vertical section on the line 8, 8, Fig. 7, looking in the direction of the arrows, showing the gap filling segment or section in its advanced or projected position. Fig. 9, is a broken detail view in section, on the line 9, 9, Fig. 16, looking in the direction of the arrows, showing the front end portions of the interlocking fingers of the stationary and movable parts of the platform, with the latter in retracted position. Fig. 10 is a view similar to Fig. 8, showing the movable portion of the platform in retracted position. Fig. 11 is a broken view in top plan indicating the bumper rolls at the end of a movable section of the platform. Fig. 12 is a view similar to Fig. 7, showing the flooring removed so as to disclose the frame and operating mechanism of the movable section of the platform. Fig. 13, is a vertical section on the line 13, 13, Fig. 10, looking in the direction of the arrows. Fig. 14 is a broken detail view in section through a supporting wheel of the movable portion of the platform on the line 14, 14, Fig. 12. Fig. 15 is a broken view in front elevation of the bumper rollers shown in Fig. 11. Fig. 16 is a broken view in front elevation of the front edge of a movable portion or section of the platform. Fig. 17 is a similar view somewhat enlarged. Fig. 18, is a top plan view of the construction shown in Fig. 17. Fig. 19 is a broken view in top plan showing a modified arrangement wherein the movable portion or section of the platform is carried and moved out by means of a motor operated swinging arm. Fig. 20 is a vertical section on the line 20, Fig. 19. Fig. 21, is a detail view of a contact device employed in connection with the operation of the construction shown in Figs. 19 and 20. Fig. 22 is a broken view in top plan showing a modified form of our invention wherein the movable section is advanced by the direct action of motors connected thereto. Fig. 23 is a vertical section of the same on the line 23, 23, Fig. 22, looking in the direction of the arrows. Fig. 24 is a broken view in top plan showing a modified arrangement wherein the movable section of the platform is normally held retracted by spring pressed pantograph arms. Fig. 25, is a similar view with the floor of the stationary portion of the platform removed disclosing power mechanism for advancing the movable portion of the platform. Fig. 26 is a vertical section on the line 26, 26, Fig. 24. Fig. 27 is a broken view in top plan showing a modified arrangement wherein the movable section of the platform is in the form of a motor operated extensible apron. Fig. 28 is a vertical section on the line 28, 28, Fig. 27, looking in the direction of the arrows. Fig. 29 is a broken view in top plan showing another form of construction wherein the movable section of the platform is directly connected to the power mechanism for projecting the same. Fig. 30 is a vertical section of the same on the line 30, 30, Fig. 29, looking in the direction of the arrows. Fig. 31, is a detail view showing a yielding connection to resist the friction of the car side on the buffer roller of the movable section of the platform. Fig. 32 is a broken view in top plan showing another arrangement wherein the movable section or portion of the platform is counterweighted and manually operated. Fig. 33 is a vertical section on the line 33, 33, Fig. 32, looking in the direction of the arrows.

The same part is designated by the same reference sign wherever it occurs throughout the several views.

In the construction of street and railway track systems, such as subway, elevated and surface lines, and particularly where boarding and alighting platforms are provided for passengers to step directly to and from the same in alighting from or boarding the car or train standing alongside the platform it is frequently necessary to leave considerable space between the line of the side of the car or train and the proximate edge of the station platform in order to provide the necessary clearance therebetween. Particularly is this true where the station is located on a curve of the track rails. Such a space between the car or train and the station platform is a fruitful source of accident and injury to passengers who are required to alight from or to board the car by stepping across such space, and who frequently miss the car or the platform and fall down or are crowded from the car or the platform into such space, thereby receiving injury. It also sometimes happens that the car or train is inadvertently started while a passenger or a foot or leg of a passenger has become wedged in such space, with serious and sometimes fatal results.

It is among the special purposes of our present invention to provide means for avoiding such accidents and to render the operation of cars or trains in connection with such platforms or station landings more safe for passengers while boarding or alighting from the cars or trains.

In carrying out our invention we propose, in a broad statement of our objects and purposes, to provide the stationary landing or station platform with one or more movable sections or segments which are moved or extended from the edge thereof toward the side of the car or train so as to fill up the intervening space and to afford a flooring or support all the way to the side of the car or train, thereby eliminating the intervening gap or space and hence eliminating the possibility of accident or injury by reason of passengers inadvertently stepping or slipping into such space. The movable section, or sections of the platform may take various forms and have various arrangements for projecting the same into position for use and for withdrawing or retracting the same, and we have shown several arrangements for the purpose in order to illustrate various practical embodiments of the principles of our invention, and these will be more fully described and explained in detail hereinafter. In connection with the movable portions of the station platform we also propose to provide operating and controlling means for effecting the physical advancement and retraction thereof in timely relation to the movements of the car or train, and in such manner that the advancement movement is accomplished only when the car or train is at rest in a predetermined position, thereby insuring the proper relation of the car or train and the movable portion or portions of the platform when the advancement is effected. To this end we propose to control the operation of the movable portion or portions of the station platform conjointly by the car or train and control devices on the stationary platform. In order to avoid the useless operation of platform sections when a car is not opposite thereto, that is, in order to provide for the operation of different lengths of train, or different numbers of cars, in a train, we propose to employ means partly under the control of each car of the train for controlling the particular movable platform portion or section opposite thereto so that a platform section is advanced only when a car is standing opposite the same. We also propose to employ train trip and signal mechanism so related and arranged that the train will be stopped if the segments or movable portions are not properly withdrawn. We also propose to provide a construction of movable platform section which will minimize the danger of injury to persons standing thereover during the advancing or retracting movements thereof.

Referring to the drawings we have shown, in Fig. 1, the common and objectionable arrangement wherein a car A while operating along track rails B and alongside the ordinary station platform C, leaves a considerable and dangerous space D, between the side of the car and the proximate edge of the platform. In Fig. 2 we have illustrated an application of a movable section E of the platform designed to be advanced or projected from the stationary part C, of the station platform to cover or fill the space or gap D, between the side of the car and the proximate edge of the stationary platform C.

In Figs. 6 to 18, inclusive, we have shown one practical and operative embodiment of our invention. Referring particularly to these figures of the drawing, numeral 35, designates the foundation supports for the station platform or landing C. These supports may be of masonry or other suitable or convenient construction. Mounted upon the foundation 35, is a platform supporting structure which includes the frame beams 36, and the fixed rails 37. The stationary portion C of the platform may be of concrete, as shown, or of any desired material suitable to produce a flooring. A movable framework 38, is carried by wheels 39, which operate along the stationary rails 37. The latter extend at right angles to the edge of the station platform C, and consequently the movable framework 38, operating along the rails 37, moves at right angles to the edge of the station platform C. If desired, and in order to reduce friction, the wheels 39, may be of the ball bearing type as indicated at 40, Fig. 14. If desired, and in order to insure against any vertical tilting of the movable frame 38, the stationary frame work 36, may be provided with wearing members 41, positioned above and parallel to the rails 37, and over the wheels 39, with sufficient clearance therebetween to insure smooth and easy movement of the wheels. The movable frame 38, may be guided and held steady in its movements along the rails 37, in any suitable or convenient manner. We have shown a simple and efficient arrangement for the purpose wherein said frame 38 is provided with side guards 42, arranged in pairs, at the front and rear portions thereof, and guide rollers 43, journaled upon vertical studs, are positioned to operate between said guides. In this arrangement the movable frame is truly and accurately held and guided in the movements thereof. The frame 38 may be shifted or moved back and forth along the rails 37, in any suitable or convenient manner. In Figs. 6 to 18, we have shown our arrangement for this purpose which we have found efficient and suitable. In this construction a lever 44, is pivotally mounted intermediate its ends, as at 45, upon a fixed portion of the stationary frame work. A motor 46 is connected to said lever on the upper side of its fulcrum and a motor 47 is similarly connected to the lever below its fulcrum. The upper end of the rocking lever is connected by means of a clevis 48, to the movable frame work 38. The lever rocks in a vertical plane parallel to the length of the rails 37. When the motor 47 is operated the lever is rocked in a direction to shift the movable frame along the rails 37 in a direction to project said frame beyond the edge of the stationary portion of the platform, and when the motor 46 is operated said lever is rocked in a direction to retract said frame from projected or advanced position. At its edge the stationary portion of the station platform C, or its supporting frame, in the form shown in Figs. 6 to 18, is provided with fingers 49, which are spaced apart from each other to form a grating. At their forward ends the upper edges of the fingers 49, are slightly curved downwardly, as indicated at 50, Figs. 8, 9 and 10. Mounted upon the front portion of the movable frame are coöperating fingers 51, which interlock in alternating relation with the fingers 49, and the upper edges of which, when the movable frame is fully retracted, lie slightly below the upper edges of the fixed fingers 49, but, by reason of the slight downward curvature of the upper edges of fingers 49, at their forward or outer ends, when the movable frame is advanced to its forward limit the upper edges of the movable fingers pass somewhat above the corresponding edges of the fixed fingers. By this construction the danger of disturbing a person standing on the projected portion of the station platform when the latter is retracted or withdrawn from projected position, or of one standing on the stationary grating when said movable frame is projected beyond the edge of the stationary platform, is avoided since the change of supporting surface from the stationary to the movable fingers, or vice versa, is so gradual that the weight of the person is transferred from the one to the other smoothly and easily, and without danger of disturbing the equilibrium of the person standing thereon. If desired suitable means may be provided to yieldingly receive the impact of the movable portion of the platform with the side of the car when said movable portion is advanced to fill or bridge the gap or space between the side of the car and the station platform. A simple arrangement for the purpose is shown wherein bell crank levers 52, are pivotally mounted at one end upon or adjacent the end of a movable section or segment of the platform. Intermediate its ends, or at its angle, each bell crank lever carries a buffer roll 53, and a spring 54, acting against the other arm of the bell crank lever tends to yieldingly rock said lever in a direction to force the buffer rolls outwardly somewhat in advance of the front or advancing edge of the movable portion of the platform, and into position to take the impact of the side of the car. This construction avoids unnecessary shock due to the approach of the car side and the proximate edge of the movable section of the platform, when the latter is moving therepast, and also affords yielding means by which the initial retracting movement of the platform section may be inaugurated by the pressure of the side of the car or train thereagainst as it proceeds on its way from a stop at a station. It will be understood that a buffer roller arrangement may be provided, as indicated, at each end of the movable section of the platform. In order to take the wear of the buffer rolls a side strip or plate may be applied to the side of the car.

We will now describe the electric circuit connections and interlocking signaling system, through which the semi-automatic operation of the movable portion of the platform is accomplished, particular reference being had to Figs. 3, 4 and 5.

It is to be observed that in order to attain the highest degree of safety and to reduce the danger of accident and injury to the lowest possible minimum, each car should occupy a predetermined position opposite its coöperating movable platform portion or section before said portion or section is advanced to fill or cover the gap between the side of said car and the proximate edge of the station platform. To accomplish this result we propose to control the movement of the movable platform section conjointly by the position occupied by the car, or train, and by manually or other operated means on the platform. We also propose to provide means controlled by the position of the movable platform sections for controlling the respective motors or other devices employed for operating them. We also propose to control the train trip device or the train track signal system by the respective relative positions of advancement or retraction of the movable sections or portions of the platform. One electrical system for accomplishing these and other purposes is shown in Figs. 3, 4, and 5, as illustrative of the principles of our invention, and wherein the motors for operating the movable sections E of the platform to their projected positions are controlled by devices 105, here indicated as electropneumatic valves, while the motors for operating the sections E, to retracted position are controlled by devices 106, also indicated as electropneumatic valves. The track rails B upon which the car or train operates are shown associated with the ordinary third rail 107, through which current is supplied to the car or train propelling motor or motors. At or adjacent each end of the station or platform is a short section of insulated conductor 108, 109, to which circuit is completed from the third rail or conductor 107, only when the car or the first car reaches the same or passes thereover, as indicated by dotted lines 110, 111. Opposite each movable section E of the platform is a short insulated section of track rail, indicated at 112, which is grounded only when a car truck is standing thereon. In order to explain the operation we will assume that a car or train is approaching the station from the right. When said car, or the first car of the train reaches the section 108, of conductor a circuit is completed as follows: from the third rail 107, through connection 108, wire 113, contacts 114, which at this time are closed, wire 115, the coils 116 of a solenoid, which, when energized, opens contacts 114, and closes contacts 117, 118, and from coil 116, said circuit continues through wire 119, and the contacts 120, in series, to ground or return as indicated at 121. It will be observed that this circuit is not completed unless all the contact devices 120 are closed. These contacts are closed only after the electro-pneumatic valve devices 106 are energized, that is, only when the motors which retract the movable sections E have all been operated and said sections withdrawn into retracted position. It will be seen that the circuit to conductor section 108 is closed only for a short interval of time as the car or first car of a train (and when we refer to a car we intend to include either a single car or the first car of a train) passes thereover. However, when the circuit above traced is completed and the relay solenoid 116 is energized this circuit is broken at contact 114, but the same action which breaks the contacts 114, closes the contacts 118, and thereupon circuit source through wire 122, wire 123 contacts 118 and the coils of solenoid 116, wire 119, and contacts 120 to ground at 121. Consequently when the circuit connection at 108 is broken by the car passing beyond said conductor section in approaching the station the solenoid 116, remains energized, and the contacts 117, 114, and 118, remain closed. This is the condition when the car reaches the conductor section 109, whereupon a circuit is completed from the third rail 107, through connection 111, conductor 109, wire 124, contacts 117, wire 126 in which is located a switch device 125, on the station platform, which is under the control of a station attendant and which, when closed, completes said circuit through all the motor control devices or electropneumatic control valves 105, which control the advancing movements of the platform sections E. These control devices are in multiple relation to each other. The branch or multiple circuits which include the motor control devices 105, may be grounded, or connected to return, as indicated at 127. In such case all the movable sections E of the platform will be advanced by the operation of their respective motors. It may be desired, however, to advance only the particular platform section or sections opposite which a car or cars are standing, thereby avoiding an unnecessary operation of platform sections where there are no cars for them to coöperate with. To accomplish this instead of directly grounding the circuits of motor control devices at 127, we omit the grounds at these points and connect the circuits of said respective contact devices to the short insulated track sections 112, respectively positioned opposite, or in coöperative relation to the sections E, as indicated by the dotted lines at 128. With this arrangement the circuit of the motor control device 105 of any platform section E, is completed through the connection 128, track section 112, and truck of the car standing opposite said section on the track rails, with the truck or a portion thereof occupying the insulated section 112 of the track. Consequently the motor which operates a platform section to advanced position is not actuated unless a car is standing opposite thereto, and then only when the car or first car of the train is in position to complete the circuit connection from the third rail 107, to the conductor section 109, and also, only when the station platform switch 125, is closed. It will also be seen that this operation is not accomplished unless the relay solenoid 116, has been energized, and this is made possible only by the approach of the car or train to the platform through the conductor section 108, and also only when all the contacts 120 are closed, that is, only when all the platform sections are fully withdrawn into retracted position. When the car or first car of the train passes beyond the conductor section 109, as it departs from the station, or when the station switch 125 is opened, the circuit of the motor control devices 105 is broken, and the motors which advance the platform section are rendered inoperative. This, however, does not affect the platform sections which have been advanced. In fact after the platform sections have been advanced the station switch 125 may be opened without material result. The only requirement is that this switch be closed when the car of the train, arrives at the point necessary to close the circuit connection 111, to the conductor section 109. This arrangement removes the possibility of inopportune or untimely operation of the movable platform sections due to the untimely operation of the platform switch 125, that is, it removes largely the danger of accident due to the personal element involved in the manual operation and control of the switch 125.

As the car or train departs from the station the pressure of the side of the car or cars against the projected platform sections E, and especially at stations located at curved portions of the track, causes said platform sections to be forced back toward retracted position. The movements of each platform section E, controls the sets of contacts 130, 131, and 132, in such manner that when the platform sections E are fully projected the associated contacts 130 and 132 are opened, and the contacts 131 are closed. When the sections E are partly retracted a certain distance the contacts 130 are closed with the contacts 131 remaining closed, and when the sections E are completely retracted the contacts 132 are closed and the contacts 131 are opened, the contacts 130 remaining closed. The contacts 130 and 131 are included in series in the circuit of the independent current source through wire 122, wire 123, wire 133, contacts 130, contacts 131, wire 134, contacts 135 retracting motor control device 106, to ground at 136. A similar circuit connection is completed through the retracting motor control device 106, for each platform section and from the same independent current source or wire 122, these several circuits being in parallel and each of these circuits is dependent upon its associated platform section E being partially retracted. The completion of the circuit last traced, through a motor control device 106, causes the retracting motor of that particular platform section E, to be operated thereby completing the withdrawal movement of the platform section. It will be seen, therefore, that if an advanced platform section is not partially retracted by the pressure of the car or train thereagainst while departing from a station, the circuit of its retracting motor control device will not be completed and said platform section will remain in projected position. In such case accident is prevented by the failure of the car starting signal to properly operate, or by the action of a train track tripping device. We have indicated at 137, 138, suitable devices which are located at opposite ends of the station or platform, and which may be either a tripping device of a common form, or a signal device, and which is automatically operated to set position when the circuit thereof is broken, and to retracted position when said circuit is completed. The signal device 138 is set against another car or train entering the station while one car or train is at the station, while the signal device 137, is set against the car or train at a station starting or departing therefrom. These signal devices are included in a circuit with a source of current, indicated at 139, and which circuit includes all the contacts 132 in series. Consequently all the movable sections E of the platform must be occupying completely retracted positions before this signal circuit is completed and consequently before a car or train can depart from the station or before another car or train can approach the station, because all the movable sections E must be in fully retracted positions before the contacts 132 are closed. The closing of the contacts 132, may be accomplished by the retracting movement of the platform sections E, in any suitable or convenient manner. A simple arrangement is shown (see Fig. 4) wherein a bridge member 140 is carried by a rod 141 which is yieldingly held projected endwise by a spring 142, into the path of the retracting movement of the section E. When the section E is projected into position against the side of the car the bridge member 140, closes between contacts 131, and when the section E is fully retracted it engages the end of rod 141, and shifts the same endwise, thereby carrying the bridge 140, out of bridging relation with respect to contacts 131 and into bridging relation with respect to contacts 132. In like manner the contacts 130 may be controlled by the movements of the section E, in any suitable or convenient manner. A simple arrangement is shown in Fig. 5, wherein a rod 143 is carried by a projection 144 of the member E, and a bridge member 145 bridges the contacts 130, when the section E is partially retracted from advanced position and breaks circuit between said contacts when the section E is fully advanced.

It will be seen that the circuits of the retracting motor control devices 106, as above traced, includes contacts 135. These in turn are controlled by the advancing motor control devices 105, and are closed only when the said devices are out of action. Consequently it is impossible to operate the retracting motor control devices 106, in the manner above described, except when the advancing motors are out of action.

It may sometimes be desired to operate the retracting motor in an emergency. To provide for this we employ a station switch device 146 which, when closed, completes a circuit from an independent current source, as through wire 122, through each of the retracting motor control devices 106, to ground or return at 136, and in this manner effecting the complete withdrawal movement of the platform section whenever necessity for such emergency operation arises.

When we refer to the signal devices 137, 138, we wish to include any suitable or convenient form of block signal or safety trip device such as is commonly employed in connection with the operation of railway systems.

It will be seen that if the platform sections E or any one of them at a station is advanced inadvertently or by the application of unauthorized power to their advancing motors, the circuit of signal devices 137, 138, will be broken and said devices will be operated to set position thereby indicating that an approaching as well as the departing car or train should be stopped.

In case it is desired that a train or car should pass by a station equipped with movable platform sections, without slowing down or stopping, the station switch 125 is not closed, and sufficient time is not permitted for the relay solenoid 116 to be sufficiently energized when the car or train passes over the conductor section 108, this conductor section being made comparatively short, its length determining the time required to energize the relay solenoid.

From the foregoing description it will be seen that the car or the first car of the train primarily controls the operation of the platform sections, and that each succeeding car of the train exerts a secondary control over the platform section directly opposite it.

By closing the station switch 125, before the train or car stops, the required platform sections are moved out against the sides of the cars as soon as the circuit connection 111 is closed to the conductor 109, and the power of withdrawing the advanced platform sections, under normal conditions, is not under the station attendant but is controlled by the departure of the train from the station.

We will now describe various other practical embodiments of our invention.

Referring, particularly, to Figs. 19, 20 and 21, we have shown the movable section 55 of the platform connected to one arm of bell crank levers, one of which is shown at 56, and to the other arm of said lever is connected the piston rod 57 of a compressed air motor 58. When air is supplied to one end of the motor cylinder the piston rod 57 is moved out thereby rocking the lever 56, and advancing the movable section 55 of the platform from beneath the edge of the stationary portion C of the platform. The movable section 55 is supported and moves along brackets 59, secured to or forming part of the framework which supports the stationary portion C of the platform. The supply of motive fluid to the cylinder 58, is controlled by an electro-pneumatic valve 60, associated with a supply pipe 61. This valve may be controlled in any suitable or convenient manner. We have shown an electric control therefor which is dependent upon the position of the car A, and also upon the operation of a switch device upon the station platform. In the particular arangement shown for this purpose the car A carries a contact shoe 62, which makes contact with a short section of conductor rail 63, only when the car is in a predetermined position with reference to the platform. This contact shoe is in electrical connection, in any suitable manner, not shown, with the third rail which supplies current to the car propelling motor. When the car is in its predetermined position relative to the platform, with the auxiliary contact shoe 62, on the short section of conductor 63, circuit is completed through wire 64, a solenoid coil 65, a platform switch 66, when the latter is closed, and through coils of electro-pneumatic valve 60, and to return through wire 67, to ground, or to the track rail B, or otherwise. The completion of this circuit, which, it will be observed, is under the joint control of the auxiliary contact shoe 62 on the car and the station switch 66, causes the valve 60 to open to admit motive fluid to the cylinder 58, thereby causing the movable section of the platform to be swung out against the side of the car. The completion of the circuit above described through the solenoid coil 65, closes the contacts 68, thereby establishing a branch circuit 69, through the solenoid coil 65, and hence maintaining the said coil energized after the platform switch 66, has been opened, provided the movable section of the platform has been swung outwardly a sufficient distance to relieve pressure on a spring pressed rod 70, which controls a contact device 71. The contacts of this device are included in the branch circuit 69, and when closed the branch circuit 69 is closed through the valve 60 to return. Therefore as long as the movable section of the platform remains projected the circuit of motor valve 60, remains closed independently of the platform switch. The rod 70, is arranged to be engaged by a convenient part of the movable portion 55, or its moving mechanism indicated at 72, when said portion is retracted, thereby opening the contact 71 and hence deënergizing the solenoid coils 65, and also the coils of the valve 60. In this case the movable section of the platform is forced back into retracted position by the contact of the side of the car with the buffer rollers 73, when the car proceeds on its way.

In Figs. 22 and 23, we have shown an arrangement wherein the movable section 74 of the platform is directly connected to and advanced by one or more motors 75, and is retracted or forced back by contact of the side of the car with the buffer rollers 76. This arrangement, as well as that shown in other views where the movable section is forced back, either partially or wholly by the car side pressing against the buffer rollers, is more particularly designed for use where the car tracks are on a curve at the station, thereby enabling the overhang of the car in making the curve to accomplish the retraction of the movable portion of the platform.

In Figs. 24, 25, and 26, we have shown an arrangement of spring retracted, motor operated pantograph arms for advancing the movable portion 77, of the platform. In this case the pantograph arms 78 are normally retracted by compression spring 79. A motor 80, suitably controlled, operates to rock the arms 78 against the action of springs 79, to advance the movable section 77, of the platform toward the side of the car A.

In Figs. 27 and 28, we have shown an arrangement wherein the movable section of the platform is in the form of a curtain 81 which is extended by means of a roller 82 engaging in a bight thereof. The roller 82 is carried by a frame 83, mounted at the edge of the stationary platform portion C, to slide back and forth upon anti friction rolls 84. A motor 85, may be employed to move the roller 82, or its carrying frame 83 back and forth. When the frame and roller are projected outwardly from the edge of the stationary platform C, the curtain 81, which is secured at one end to the platform C, and at the other over a common form of spring curtain roller 86 is unwound from said roller 86, this being the portion shown. And when the frame 83 and roller 82 are retracted the curtain winds up on said spring roller 86 in a well understood manner.

In Figs. 29 and 30, we have shown another arrangement in which the movable portion 87, of the platform is directly connected to and operated by a motor 88 to projected position, the engagement of the car side with the buffer rollers 89, serving to push the platform section 87 back into retracted position.

It may happen that the action of the car side in pushing the movable section of the platform back into retracted position, imposes a sidewise thrust upon said movable portion. In such case it may be desirable to yieldingly resist or absorb such thrust. A simple arrangement for accomplishing this is shown in Fig. 31, and in dotted lines in Fig. 29, wherein the motor 88 is connected to and moves a frame portion 90, which is provided with ears 91, through which is passed a rod 92, over which are engaged ears 93 on the movable portion 87 of the platform. One of the ears 93 engages against the inner face of one of the ears 91, while the other ear 93 engages against the outer face of the other ear 91. A compression spring 94, is interposed between one of the ears 93 and one of the ears 91. By this construction the sidewise thrust imposed by the movement of the car side past the platform section 87 is taken up and absorbed by the spring 94.

So far as the broad scope of our invention is concerned it is not necessary that the movable portion of the platform be motor operated. It may be manually operated. We have shown an arrangement in Figs. 32 and 33 wherein the movable section 95 of the platform is projecting from the edge of the stationary portion C, of the platform by means of a foot operated rod 96. In this case the movable platform section 95 is carried upon a vertically rocking lever 97, which is connected by a link 98, to one arm of a bell crank lever 99, the foot rod 96, being connected to the other arm of said bell crank lever. If desired, and in order to retract the platform section 95, when pressure upon the rod 96 is removed, a weight 100 is connected by a cord or similar device 101, to the section 95, and when said section is projected outwardly from the edge of the station platform it is against the pull of weight 100. If desired and in order to enable the movable section 95 to work easily, a counterbalancing weight 102, may be placed on the arm of bell crank lever 99, to which the rod 96 is connected.

It is obvious that our invention may be embodied in many other specific forms and arrangements without departure from the spirit and scope of our broad invention as defined in the claims. The various examples shown herein and described, however are sufficient to indicate the broad scope of our invention.

Having now set forth the objects and nature of our invention, and various forms of embodiment thereof, and having described such embodiments, their constructions, purposes, arrangements and modes of operation, what we claim as new and useful and of our own invention, and desire to secure by Letters Patent is:—

1. In a safety platform mechanism, the combination with a stationary and a movable platform portion arranged to operate in the same horizontal plane, and means to control the operation of the movable portion.

2. In a safety platform mechanism, the combination with a stationary and a movable platform portion arranged to operate in the same horizontal plane, and means controlled by a predetermined position of a car or train with reference to the movable portion to control the operation of the latter.

3. The combination with a landing platform and a track adjacent the edge thereof, of a movable section for the platform located at the track edge thereof to operate in the same horizontal plane therewith, and means for moving said section toward and from the side of a car located on the track.

4. The combination with a landing platform, and a track adjacent the edge thereof, of a movable section for the edge of the platform, and having its upper surface in the same horizontal plane as that of the platform and power mechanism for moving said section toward the track rails.

5. The combination with a landing platform, of a movable section therefor and means for projecting said section beyond the edge of the landing platform in the horizontal plane thereof.

6. The combination with a landing platform, of a movable section therefor having its upper surface in the same plane as that of the platform, and power operated means to project said section beyond the edge of the landing platform.

7. The combination with a landing platform and a track alongside the same, of a movable section for said platform having its upper surface lying in the same plane with that of said platform, means to project said section beyond the edge of the landing platform and toward the side of a car standing on the track, said car operating when moved to retract said section.

8. The combination with a landing platform having a movable section at the edge thereof, of means controlled conjointly by the position of a car alongside said platform and a controller on the platform, for advancing said section toward the car.

9. The combination with a landing platform, and a movable section for the edge thereof and occupying the same horizontal plane therewith, of a motor for advancing said section beyond the edge of the platform, and means for controlling said motor.

10. The combination with a landing platform, and a movable section at the edge thereof and occupying the same horizontal plane therewith, of a motor for advancing said section beyond the edge of the platform, and means controlled by the position of a car opposite said section for controlling said motor.

11. The combination with a landing platform and a movable section at the edge thereof, of a motor for advancing said section beyond the edge of the platform, means controlled by the position of a car opposite said section for controlling said motor, and means located on the platform for also controlling said motor.

12. The combination with a landing platform and a movable section at the edge thereof, of a motor for advancing said section beyond the edge of the platform, and means controlled conjointly by the position of a car opposite said section and by a controller on the platform, for controlling said motor.

13. The combination with a landing platform and a movable section at the edge thereof and occupying the same horizontal plane therewith, of means for advancing said section beyond the edge of the platform, and means for withdrawing the advanced section toward retracted position.

14. The combination with a landing platform and a movable section at the edge thereof and occupying the same horizontal plane therewith, of means for advancing said section beyond the edge of the platform, and a motor for retracting the same.

15. The combination with a landing platform and a movable section at the edge thereof, of means for advancing said section beyond the edge of the platform, a motor for retracting the same, and means controlled by the position of the movable section for controlling said motor.

16. The combination with a landing platform and a movable section at the edge thereof and occupying the same horizontal plane therewith, of means for advancing said section beyond the edge of the platform, a motor for retracting the same and means controlled by the movement of a car departing from said section to control said motor.

17. The combination with a landing platform and a movable section at the edge thereof and occupying the same horizontal plane therewith, of means for advancing said section beyond the edge of the platform, a motor for retracting the same, and means controlled from the platform for controlling said motor.

18. The combination with a landing platform and a movable section at the edge thereof, of means for advancing said section beyond the edge of the platform, a motor for retracting the same, means controlled by the movement of a car departing from said section for controlling said motor, and independent means on the platform for controlling said motor.

19. The combination with a landing platform and a movable section at the edge thereof and occupying the same horizontal plane therewith, of motors for advancing and retracting said movable portion, and means for controlling said motors.

20. The combination with a landing platform and a movable section at the edge thereof, of a motor for advancing said section beyond the edge of the platform, an electric device for controlling said motor, a circuit therefor, and means controlled by the position of a car for supplying current to said circuit.

21. The combination with a landing platform and a movable section at the edge thereof, of a motor for advancing said section beyond the edge of the platform, an electric device for controlling said motor, a circuit therefor, means controlled by the position of a car for supplying current to said circuit and means also controlled by the position of a car opposite said section for completing said circuit.

22. The combination with a landing platform and a movable section at the edge thereof, of a motor for advancing the same beyond the edge of the platform, an electric device for controlling said motor, a circuit therefor, means controlled by the position of a car for supplying current to said circuit, and a switch device for said circuit, said switch device being located on the landing platform.

23. The combination with a landing platform and a movable section at the edge thereof, of a motor for advancing the same beyond the edge of the platform, an electric device for controlling said motor, a circuit therefor, contacts in said circuit and means controlled by the approach of a car or train to said landing platform for closing said contacts.

24. The combination with a landing platform and a movable section at the edge thereof, of a motor for advancing the same beyond the edge of the platform, an electric device for controlling said motor, a circuit therefor, contacts arranged in said circuit, means controlled by the approach of a car or train to said landing platform for closing said contacts, and means controlled by the arrival of the car or train in predetermined position for supplying current to said circuit.

25. The combination with a landing platform and a movable section at the edge thereof, of a motor for advancing said section beyond the edge of the platform, an electric device for controlling said motor, a circuit therefor, contacts controlled by the approach of a car or train to the platform and arranged in said circuit, means controlled by the arrival of the car or train in predetermined position with respect to the platform for supplying current to said circuit, and a switch located on the platform for controlling said circuit.

26. The combination with a landing platform having a movable section at the edge thereof, a motor for advancing said section beyond the edge of said platform, an electric device for controlling said motor, a circuit therefor, contacts arranged in said circuit and controlled by the approach of a car or train toward the platform, means made operative by the arrival of the car or train in predetermined relation to the platform for supplying current to said circuit, and secondary devices dependent upon the arrival of a car opposite the movable section for completing said circuit.

27. The combination with a landing platform having a movable section at the edge thereof, and means for advancing and retracting said section, of a car or train signal device, and means controlled by the movements of said section for controlling said signal device.

28. The combination with a landing platform having a movable section at the edge thereof, and means for advancing and retracting the said section, of a signal device at the end of the platform, a circuit therefor, and means controlled by the movements of said section for controlling said circuit.

29. The combination with a landing platform having a movable section at the edge thereof, and means for advancing the same beyond the edge of the platform, of a car or train signal device, and means controlled by the advancement of said section for rendering the signal operative.

30. The combination with a landing platform having a movable section at the edge thereof, and means for advancing and retracting the same, of a car or train signal device, and means controlled by the return of said section to withdrawn position for rendering said signal device inoperative.

31. The combination with a landing platform having a movable section at the edge thereof, and means for advancing and retracting the same, of a car or train signal device, and means controlled by the advancement of said section for rendering said signal device operative, said means operating to render the signal device inoperative by the retraction of said section to withdrawn position.

32. The combination of a landing platform, a movable section therefor at the edge thereof, and means for advancing and retracting said section, of a car or train signal device, a circuit therefor, said circuit arranged to be broken when said section is advanced beyond the edge of the landing platform, and to be completed when said section is returned to retracted position.

33. The combination of a landing platform having a plurality of movable sections at the edge thereof, independent means for moving each section, and means controlled jointly by the first car of a train and the particular car standing opposite each section, for controlling the moving means of said section.

34. The combination with a landing platform, of a movable section at the edge thereof, a rock lever connected to said movable section, independent motors respectively connected to said lever on opposite sides of its fulcrum, and means for controlling said motors.

35. The combination with a landing platform having a movable section at the edge thereof, a rock lever connected to said movable section, independent motors respectively connected to said lever on opposite sides of its pivot, means controlled by a car standing opposite said section for controlling one of said motors to advance said section beyond the edge of said platform, and means controlled by the partial retraction of said movable section for controlling the other of said motors to complete the retracting movement of said section.

36. The combination with a landing platform having a movable section at the edge thereof and occupying the same horizontal plane therewith, and means for moving said section, of a buffer device yieldingly mounted upon said section to extend beyond the edge of said section.

37. The combination with a landing platform having a movable section at the edge thereof, and means for advancing said section beyond the edge of said platform, of a bell crank lever pivotally connected at one arm to said movable section, a spring acting against the other arm of said lever, and a buffer roller carried at the angle of said lever, and extending beyond the edge of said section.

38. The combination with a landing platform having a movable section at the edge thereof and occupying the same horizontal plane therewith and means for advancing said section beyond the edge of said platform, of a yieldingly mounted buffer device arranged at each end of said movable section to extend beyond the edge thereof.

39. The combination with a landing platform having fingers at the edge thereof, of a movable section mounted at the edge of said platform, and having coöperating fingers, and means for moving said movable section.

40. The combination with a landing platform having spaced fingers at the edge thereof, said fingers being curved downwardly at their outer ends, of a movable section having coöperating fingers said coöperating fingers extending above the downwardly curved portions of the platform fingers, and means for moving said movable section.

41. The combination with a landing platform having a guide, of a framework movably mounted with reference to said platform and engaging said guide, a platform section carried by said framework and located at the edge of said platform landing and lying in the same horizontal plane therewith, and means for moving said framework.

42. The combination with a landing platform having track rails located beneath the same, a framework having wheels to operate along said rails, a platform section located at the edge of said landing platform and carried by said framework, said section lying in the same horizontal plane with the landing platform, and means for moving said framework to advance and retract said platform section with reference to the edge of the landing platform.

43. The combination with a landing platform having track rails and a guide, of a movable framework engaging said guide and having wheels to operate along said rails, a platform section carried by said framework, said section lying in the same horizontal plane with the landing platform, and means for moving said framework to advance and retract said platform section with reference to the edge of the landing platform.

In testimony whereof we have hereunto set our hands in the presence of the subscribing witnesses, on this 3rd day of September, A. D., 1914.

FRANK HEDLEY.
JAMES S. DOYLE.

Witnesses:
H. M. NORRIS,
H. P. TITUS.